United States Patent Office 3,396,294
Patented Aug. 6, 1968

3,396,294
VIBRATORY MOTOR
Shinobu Makino, Tokyo, Japan, assignor to Shinko Electric Co., Ltd., Tona, Mie-ken, Japan, a company of Japan
Continuation-in-part of application Ser. No. 429,564, Feb. 1, 1965. This application Oct. 5, 1967, Ser. No. 677,828
Claims priority, application Japan, June 29, 1964, 39/37,124, 39/37,125
6 Claims. (Cl. 310—81)

ABSTRACT OF THE DISCLOSURE

A unidirectional vibratory motor comprises an electric motor having a rotary shaft, an eccentric weight received on the motor shaft and a frame surrounding and spaced from the electric motor. A pair of elastomeric bodies are disposed between the motor and the frame on opposite sides of the motor. The two elastomeric bodies are approximately parallel to each other and to the motor shaft. Each of the elastomeric bodies has an inner face secured to the motor and an outer face secured to the frame. The natural frequency of vibration of each elastomeric body in the direction of a shear plane approximately midway between the inner and outer face of the body is lower than that in a direction perpendicular to the shear plane. A large amplitude of vibration is thereby obtained in the direction of said shear planes.

---

This application is a continuation-in-part of application No. 429,564, filed Feb. 1, 1965, now abandoned.

This invention relates generally to vibratory motors and more particularly to vibratory motors for uni-directional vibrating machines, such as vibrating conveyors and vibrating screens.

The conventional uni-directional vibrating machine is operated by a pair of vibrating units each of which comprises an electric motor provided with a gear which is secured on the rotary shaft of the motor and meshes with a like gear of the other unit so as to rotate in the opposite direction at the same speed. In order to develop effective vibration, it is necessary to secure an eccentric weight of large magnitude on the rotary shaft of each of the electric motors, respectively.

The principal object of the present invention is to provide an improved vibratory motor for applying uni-directional vibration, which consists of a single electric motor.

Another object of the present invention is to eliminate the gear mechanism which is required for two rotary motor vibratory systems.

Another object of the present invention is to minimize the weight of a vibratory motor compared to that of the conveyor to be vibrated, resulting in a reduction of cost of the vibratory motor.

Another object of the present invention is to increase the conveying capacity of a conveyor to be vibrated by increasing the amplitude of vibration.

A further object of the present invention is to provide means to adjust the amplitude of vibration.

A conventional electro-magnet, used as a vibrating motor for a conveyor of 70 kg. in weight, for example, should have a weight of about 140 kg. including springs. Such conveyor is generally vibrated at an amplitude of 1.7 mm., and the capacity of the conveyor is about 30 tons of material per hour. In this case, the weight of the electro-magnet is twice of that of the conveyor.

A rotary motor according to the present invention may be of about 30 kg. in weight for a conveyor having a weight of 42 kg. and the conveyor can be vibrated at an amplitude of 2 mm. and have a conveying capacity of 50 tones of material per hour.

Thus, the weight of the rotary motor of the present invention applied to a conveyor can be reduced to a remarkably smaller value compared to the weight of a conveyor, while the weight of a conventional electro-magnet should be twice of that of the conveyor. Moreover, the conveying capacity of the conveyor can be remarkably increased because of its larger amplitude of vibration.

The remarkably large amplitude of vibration is obtained by using elastomeric bodies on two opposite sides of a rotary motor. Each elastomeric body is preferably made in the shape of a rectangular plane or sheet, and the natural frequency in the shearing plane can be made much lower than that in a direction perpendicular to the shearing plane.

Other objects and advantages of the invention will appear hereinafter from the following description and claims.

The accompanying drawings show for the purpose of exemplification, without limiting the invention or claims thereto, certain practical embodiments illustrating the principles of this invention wherein.

Figure 4:
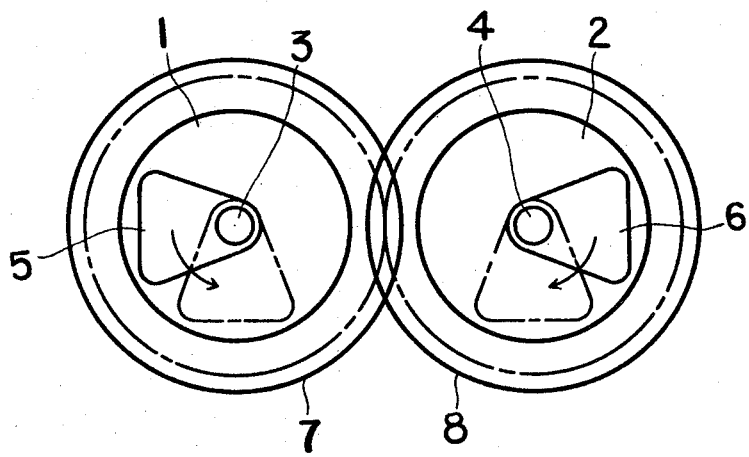
FIG. 4 is a simplified side view of a conventional uni-directional vibratory motor comprising two rotary motors for the purpose of showing the operation of the vibratory motor.

FIG. 4 shows a conventional uni-diectional vibratory motor consisting of two rotary electric motors 1 and 2, each of them provided with an eccentric weight 5 and 6 respectively on the respective rotating shaft. The two rotary motors rotate in opposite directions to each other at the same speed. Thus, a conventional uni-directional vibratory motor requires two rotary motors, each of them having a gear 7, 8 respectively secured to the motor shaft, and engaged with each other, so that the two rotary motors rotate in opposite directions at the same speed.

Figure 1:
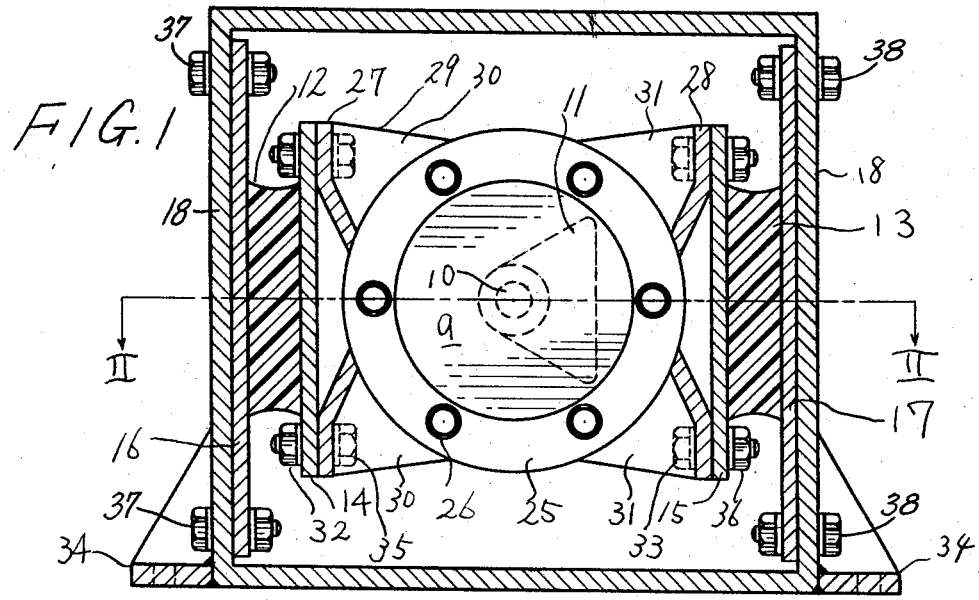
FIG. 1 is a side view of a vibratory motor comprising this invention with portions shown in section.
Figure 2:
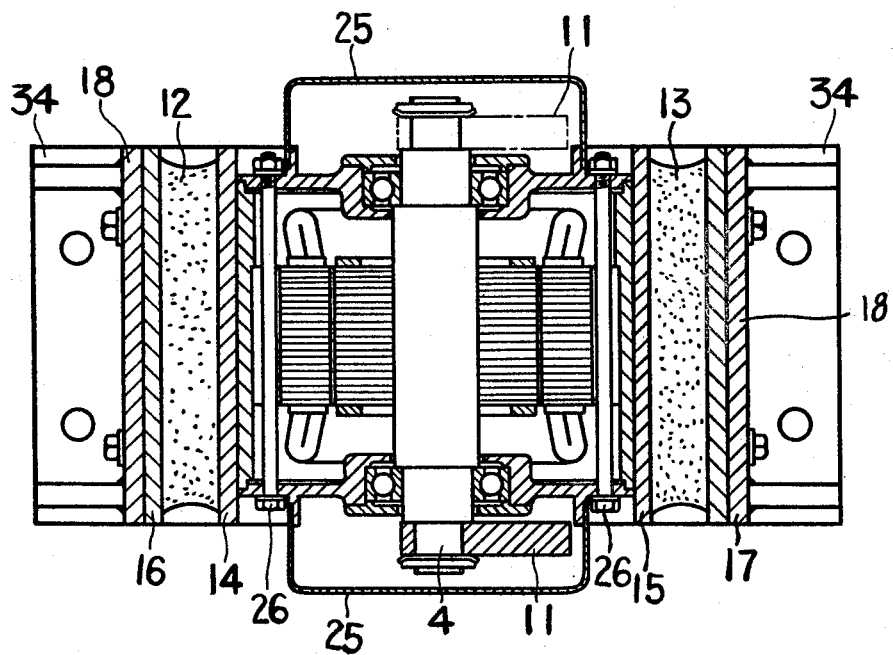
FIG. 2 is a longitudinal section taken approximately on the line II—II in FIG. 1.

FIG. 1 and FIG. 2 show, by way of example, a vibratory motor in accordance with the invention comprising a rotary electric motor 9 provided with an eccentric weight 11 secured to the rotary shaft 10 of the motor 9.

End covers 25 are fixed to both ends of the motor frame with bolts 26 and nuts, thereby covering the eccentric weight 11 as well as the main parts of the motor. A single eccentric weight 11 may be provided at one end only of the rotor of the motor or two eccentric weights may be provided respectively on opposite ends of the rotor.

On opposite sides of the motor 9 are provided outwardly projecting seats 27 and 28 with strengthening ribs 30, 31.

Two elastomeric bodies 12, 13 in the shape of rectangular plates are provided with mounting plates 14, 15, 16 and 17 adhesively secured on both sides of them by suitable bonding material. The inner mounting plates 14 and 15 are secured to mounting seats 27 and 28 of the motor stator respectively with bolts 32, 35 and nuts 33, 36. The outer mounting plates 16, 17 are secured respectively by bolts 37 and 38 to the opposite inner surface of two opposite walls of a frame 18, which surrounds the motor 9 and is preferably rectangular in cross section. Thus, the two elastomeric bodies 12, 13 are arranged symmetrically on opposite sides of the motor in parallel relation to one another and to the motor shaft. Mounting seats 34 are welded to the frame 18 as shown in FIG. 1.

Figure 3:
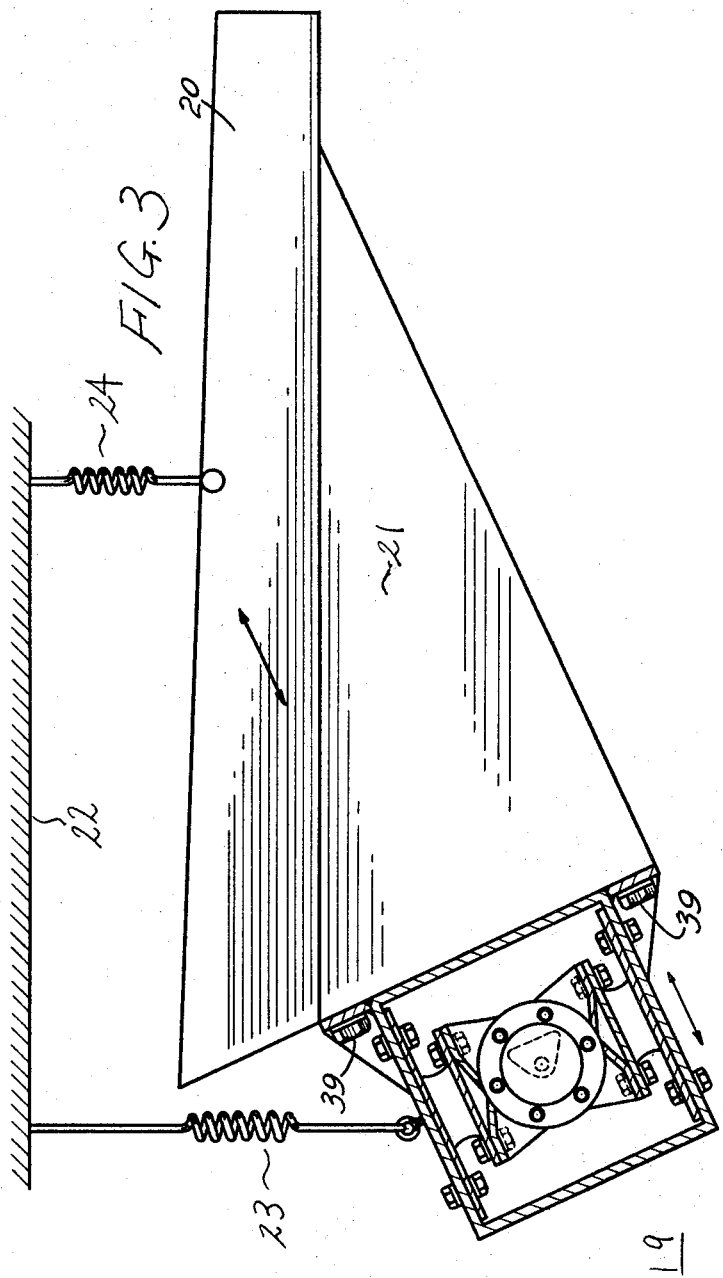
FIG. 3 is a side view of a vibrating conveyor with the vibratory motor of FIG. 1 secured thereto.

FIG. 3 shows the vibratory motor of FIG. 1 applied to a vibrating conveyor. A vibrating conveyor bed 20 is suspended from an overhead beam or from a ceiling 22 by means of springs 23, 24. A rib or frame 21 is secured to the bottom of the conveyor bed and a vibratory motor 19 is fixed by its mounting seats 34 and bolts 39 to the back side of the frame 21, the shearing planes of the elastomeric bodies 12 and 13 of the motor 19 being disposed in the plane of vibration of the conveyor bed 20 as shown by arrows in FIG. 3.

Thus, the mounting of the vibratory motor to the conveyor is very simple, because the whole of the motor can be mounted by its mounting seats 34 on to the conveyor, while an electromagnet must have its magnetic part supported elastically on the ground or suspended from overhead structures and its springs must be fixed to the conveyor.

The motor 9 when rotating, it vibrates the frame 18 substantially in the shearing plane of the elastomeric bodies 12 and 13. This vibration is transmitted to the conveyor bed 20 through the frame 21.

The natural frequency in the shearing direction of the elastomer is given as follows:

$$fs = \frac{1}{2\pi}\sqrt{\frac{Sf \cdot g}{W}}$$

and that in the direction perpendicular to the shearing plane $fc$ is given as follows:

$$fc = \frac{1}{2\pi}\sqrt{\frac{Sc \cdot g}{W}}$$

where $$W = \frac{Wc \times Wt}{Wc + Wt}$$

$Wc$: weight of the motor
$Wt$: weight of the conveyor
$g$: value of gravitational acceleration
$Sf$: spring constant of the elastomeric body in the shearing plane
$Sc$: spring constant of the elastomeric body in a plane perpendicular to shearing plane.

In case the elastomeric body is 15 mm. in thickness, 150 mm. in the direction of shearing and 200 mm. in a direction perpendicular to shearing direction in the same plane with shearing direction, $Sc$ is about sixty-four times $Sf$, and according $fc$ is about eight times $fs$.

Thus, if $fs$ is designed a few cycles higher than number of revolutions per second of the electric motor, for instance, if $fs$ is selected as 55 cycles/sec. and the speed of the motor is 50 rev./sec., then the conveyor vibrates resonantly with the motor at an amplitude of 2 mm. in the direction of the shearing plane of the elastomeric bodies, whereas, the amplitude in the direction perpendicular to the shearing plane is about 0.4 mm., since the natural frequency of the system in the latter this direction is far higher than that of the electric motor.

Strictly speaking, the conveyor is vibrated in an elliptical locus, the longer axis of which is 2 mm. and shorter axis is 0.4 mm. However, this elliptical vibration of the conveyor does not affect the conveying facility or capacity of the conveyor compared with conveying facility of the conveyor when it is vibrated in a straight line as shown by the arrows in FIG. 2.

The rotary motor may have two eccentric weights preferably each on opposite ends of the shaft, then the amplitude of the rotary motor may be adjusted by changing the angle between the two eccentric weights.

It is intended, therefore, that all matter contained in the foregoing description and in the drawings shall be interpreted as illustrative only not as limitative of the invention.

What I claim is:

1. A unidirectional vibratory motor comprising an electric motor having a rotary shaft, an eccentric weight secured on the shaft of said electric motor, a frame surrounding and spaced from said electric motor, a pair of elastomeric bodies disposed respectively on opposite sides of said electric motor and between said electric motor and said frame, each of said elastomeric bodies having an inner face secured to said electric motor and an outer face secured to said frame, each said elastomeric body having a lower natural frequency of oscillation in the direction of the shearing plane approximately midway between said inner and outer faces than in a direction perpendicular to said shearing plane, said elastomeric bodies being disposed approximately parallel to each other and to the axis of said rotary shaft with said shearing planes disposed approximately in the direction of vibration of said vibratory motor.

2. A vibratory motor according to claim 1, in which said elastomeric bodies are rectangular.

3. A vibratory motor according to claim 1, in which mounting plates are bonded to said inner and outer faces of each of said elastomeric bodies and said mounting plates are secured respectively to said electric motor and said frame.

4. A vibratory motor according to claim 1, in which two eccentric weights are secured to the electric motor shaft and means is provided for varying the angular relation between said weights and for fixing them in selected angular position relative to one another to vary the amplitude of vibration.

5. A vibratory motor according to claim 1, in which the natural frequency of oscillation of said electric motor in the direction of said shearing plane in cycles per second is near the speed of said electric motor in revolutions per second.

6. In a material conveyor comprising a conveyor bed for the material to be conveyed and means for elastically supporting said bed; a vibratory motor comprising an electric motor having a stator and a rotary shaft, an eccentric weight secured to said shaft, a frame surrounding and spaced from said electric motor, a pair of elastomeric bodies disposed respectively on opposite sides of said electric motor and between said motor and same frame, each of said elastomeric bodies having an inner face secured to said stator and an outer face secured to said frame, said elastomeric bodies having a lower natural frequency of oscillation in the direction of the shearing plane approximately midway between said inner and outer faces than in a direction perpendicular to said shearing plane, and means for fixing said frame on said conveyor with said shearing planes of said elastomeric bodies disposed in a direction at an acute angle to said bed, said vibratory motor vibrating said bed substantially in the direction of said shearing planes.

References Cited
UNITED STATES PATENTS

| | | | |
|---|---|---|---|
| 3,312,841 | 4/1967 | Makino | 310—17 |
| 3,154,704 | 10/1914 | Shaffer | 310—91 |
| 2,715,510 | 8/1955 | Fillion | 248—10 |
| 2,322,193 | 6/1943 | Kaemmerling | 248—358 |

FOREIGN PATENTS

| | | |
|---|---|---|
| 984,575 | 2/1965 | Great Britain. |
| 1,195,548 | 11/1959 | France. |
| 899,409 | 6/1962 | Great Britain. |

J. D. MILLER, *Primary Examiner.*